United States Patent
Ogura

(10) Patent No.: US 6,456,357 B2
(45) Date of Patent: Sep. 24, 2002

(54) LIQUID CRYSTAL DISPLAY DEVICE HAVING SPONTANEOUS POLARIZATION AND EVALUATION METHOD THEREFOR

(75) Inventor: Jun Ogura, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 85 days.

(21) Appl. No.: 09/749,156

(22) Filed: Dec. 27, 2000

(30) Foreign Application Priority Data

Dec. 28, 1999 (JP) .......................................... 11-375137

(51) Int. Cl.$^7$ ............................................ G02F 1/1237
(52) U.S. Cl. ........................ 349/172; 349/173; 349/174
(58) Field of Search ................................. 349/172, 173, 349/174

(56) References Cited

U.S. PATENT DOCUMENTS

| | | | | |
|---|---|---|---|---|
| 5,046,823 A | * | 9/1991 | Mori et al. ................. | 349/172 |
| 5,631,752 A | | 5/1997 | Tanaka | |
| 5,644,372 A | * | 7/1997 | Shinjo et al. ............... | 349/172 |
| 5,895,108 A | | 4/1999 | Tanaka | |
| 6,177,968 B1 | * | 1/2001 | Okada et al. ............... | 349/172 |
| 6,195,147 B1 | * | 2/2001 | Asao et al. ................. | 349/172 |

FOREIGN PATENT DOCUMENTS

JP 07-064056 3/1995

* cited by examiner

*Primary Examiner*—James A. Dudek
(74) *Attorney, Agent, or Firm*—Frishauf, Holtz, Goodman & Chick, P.C.

(57) ABSTRACT

A liquid crystal display device comprises a pair of substrates on whose opposing surfaces electrodes are formed; and a liquid crystal provided between the substrates and having spontaneous polarization and a physical property such that when a positive or negative saturation voltage whose absolute value is sufficiently large is applied between the electrodes, liquid crystal molecules are aligned in a first direction or a second direction, and when an arbitrary voltage lying between the positive saturation voltage and the negative saturation voltage is applied between the electrodes, a director is aligned in an arbitrary direction which corresponds to the applied voltage and which lies in a cone angle formed by the first direction and the second direction. The liquid crystal has a physical property which satisfies the following equation:

$$\epsilon(\theta^2/P_s^2) \leq 8$$

where $\epsilon$[F/m] is a permittivity of the liquid crystal located between the substrates, $\theta$[o] is a tilt angle defined by ½ of the cone angle of the liquid crystal, and $P_s$[nC/cm$^2$] is spontaneous polarization of the liquid crystal molecules of the liquid crystal. The constructed liquid crystal display device can provide gradation display and has less display burning.

9 Claims, 3 Drawing Sheets

LIQUID CRYSTAL DISPLAY DEVICE HAVING SPONTANEOUS POLARIZATION AND EVALUATION METHOD THEREFOR

BACKGROUND OF THE INVENTION

1. Field of the Invention

The present invention relates to a liquid crystal display device which uses a liquid crystal having spontaneous polarization, and, more particularly, a liquid crystal display device with less display burning. The invention also relates to a method of evaluating and/or predicting the degree of display burning of a liquid crystal display device which uses a liquid crystal having spontaneous polarization.

2. Description of the Related Art

Development is being actively made on liquid crystal display devices that use a ferroelectric liquid crystal and an antiferroelectric liquid crystal which are excellent in the fast response characteristic and the angle of visibility in place of liquid crystal display devices that use a conventionally popular nematic liquid crystal. The liquid crystal display device that uses an antiferroelectric liquid crystal is advantageous over the liquid crystal display device that uses a ferroelectric liquid crystal in easier alignment control of the liquid crystal molecules and higher shock absorption. Therefore, active studies have been made on the former liquid crystal display device.

Liquid crystal display devices which use a ferroelectric liquid crystal or an antiferroelectric liquid crystal have such a difficulty that their transmittances cannot be controlled arbitrarily, thus making it hard to provide gradation display. Recently, antiferroelectric liquid crystal display devices which use an antiferroelectric liquid crystal and can accomplish gradation display have been proposed as disclosed in U.S. Pat. Nos. 5,631,752, 5,895,108 and Japanese Unexamined Patent Publication (KOKAI) No. 64056/1995. As the antiferroelectric liquid crystals disclosed in those publications have a wide voltage range where an antiferroelectric-ferroelectric phase transition precursor phenomenon occurs with respect to the applied voltage, they have a number of intermediate optical states in that range. A liquid crystal display device which is capable of achieving gradation display can be provided by using such a liquid crystal and controlling the applied voltage in such a range where the liquid crystal molecules take intermediate optical states.

In the liquid crystal display devices that use a ferroelectric liquid crystal or an antiferroelectric liquid crystal, when a positive or negative voltage is applied to the liquid crystal for a long period of time, the applied voltage causes an ionic impurity present in the liquid crystal to gather in the vicinity of the electrodes due to the spontaneous polarization of the liquid crystal. The charges that are originated from the ionic impurity interact with the spontaneous polarization of the liquid crystal molecules, so that the alignment state of the liquid crystal molecules is fixed. As a result, even if application of the voltage is stopped, the liquid crystal display devices would have so-called display burning which dimly shows the previously displayed image.

At the stage of designing ferroelectric liquid crystal display devices or antiferroelectric liquid crystal display devices, it has been difficult to predict the aforementioned display burning of the liquid crystal display devices. There is no way but to actually design and make protocols of liquid crystal display devices and take real measurements on the degree of display burning empirically or the like. This takes a considerable time and cost in designing and manufacturing display devices.

SUMMARY OF THE INVENTION

Accordingly, it is an object of the present invention to provide an antiferroelectric liquid crystal display device with suppressed display burning.

It is another object of the invention to provide a display-quality evaluation method for a liquid crystal display device, which can evaluate the degree of display burning without actually measuring the degree of display burning.

To achieve the first object, according to the first aspect of the invention, there is provided a liquid crystal display device comprising:

a pair of substrates arranged opposite to each other;

electrodes arranged on opposing surfaces of the pair of substrates and facing each other; and a liquid crystal provided between the substrates and having spontaneous polarization and a physical property such that when a voltage of one polarity and a sufficiently large level is applied between the electrodes, liquid crystal molecules are aligned in a first direction, when a voltage, of a polarity opposite to the one polarity and a sufficiently large level is applied between the substrates the liquid crystal molecules are aligned in a second direction, and when a voltage lying between the voltage of the one polarity for aligning the liquid crystal molecules in the first direction and the voltage of the other polarity for aligning the liquid crystal molecules in the second direction is applied between the electrodes, a director is aligned in an arbitrary direction corresponding to the applied voltage and in a cone angle formed by the first direction and the second direction, the physical property satisfying a following equation:

$$\epsilon(\theta^2/P_s^2) \leq 8 \tag{1}$$

where $\epsilon$[F/m] is a permittivity of the liquid crystal located between the substrates, $\theta$[o] is a tilt angle defined by ½ of the cone angle of the liquid crystal, and $P_s$[nC/cm$^2$] is spontaneous polarization of the liquid crystal molecules of the liquid crystal.

The liquid crystal display device according to the first aspect of the invention is constructed in such a manner that the value of a normalized permittivity $\epsilon_s[=\epsilon(\theta^2/P_s^2)]$ which is acquired by normalizing the permittivity $\epsilon$ with the square of the tilt angle $\theta$ and the square of the spontaneous polarization $P_s$ meets the equation 1. Although the liquid crystal display device uses the liquid crystal having spontaneous polarization that is likely to cause display burning as compared with the conventional TN liquid crystal or the like, therefore, the occurrence of display burning can be restrained. It is therefore possible to provide high-quality gradation display which is less influenced by display burning while making good use of the merits of the liquid crystal having spontaneous polarization, such as an excellent response characteristic.

It is preferable that the normalized permittivity $\epsilon_s$ be 5 or lower. Further, the equation 1 can be applied to both a ferroelectric liquid crystal and an antiferroelectric liquid crystal, and a liquid crystal display device which uses either type of liquid crystal can effectively suppress display burning.

To achieve the first object, according to the second aspect of the invention, there is provided a liquid crystal display device comprising:

a pair of substrates arranged opposite to each other;

electrodes arranged on opposing surfaces of the pair of substrates and facing each other; and a liquid crystal provided between the substrates and having spontaneous polarization and a physical property such that when a voltage of one polarity and a sufficiently large level is applied between the electrodes, liquid crystal molecules are aligned in a first direction, when a voltage of a polarity opposite to the one polarity and a sufficiently large level is applied between the substrates, the liquid crystal molecules are aligned in a second direction, and when a voltage lying between the voltage of the one polarity for aligning the liquid crystal molecules in the first direction and the voltage of the other polarity for aligning the liquid crystal molecules in the second direction is applied between the electrodes, a director is aligned in an arbitrary direction corresponding to the applied voltage and in a cone angle formed by the first direction and the second direction, the physical property satisfying a following equation:

$$C(\theta^2/P_s^2) \leq 0.8 \quad (2)$$

where $C[F/cm^2]$ is a capacitance of the liquid crystal display device per unit area, $\theta[o]$ is a tilt angle defined by ½ of the cone angle of the liquid crystal, and $P_s[nC/cm^2]$ is spontaneous polarization of the liquid crystal molecules of the liquid crystal.

This liquid crystal display device is constructed in such a manner that as apparent from the equation 2, the value of a normalized capacitance $[C(\theta^2/P_s^2)]$ which is acquired by normalizing the capacitance C with the square of the tilt angle $\theta$ and the square of the spontaneous polarization $P_s$ becomes equal to or smaller than 0.8. Although the liquid crystal display device uses the liquid crystal having spontaneous polarization, therefore, display burning is unlikely to occur. This makes it possible to provide high-quality gradation display which is less influenced by display burning while making good use of the merits of the liquid crystal having spontaneous polarization, such as an excellent response characteristic.

To achieve the second object, according to the third aspect of the invention, there is provided a method of evaluating display burning of a liquid crystal display device comprising a pair of substrates arranged opposite to each other, electrodes arranged on opposing surfaces of the pair of substrates and facing each other, and a liquid crystal provided between the substrates and having spontaneous polarization and a physical property such that when a voltage of one polarity and a sufficiently large level is applied between the electrodes, liquid crystal molecules are aligned in a first direction, when a voltage of a polarity opposite to the one polarity and a sufficiently large level is applied between the electrodes, the liquid crystal molecules are aligned in a second direction, and when a voltage lying between the voltage of the one polarity for aligning the liquid crystal molecules in the first direction and the voltage of the other polarity for aligning the liquid crystal molecules in the second direction is applied between the electrodes, a director is aligned in an arbitrary direction corresponding to the applied voltage and in a cone angle formed by the first direction and the second direction. The method comprises a property evaluation step of acquiring a physical property including a permittivity of the liquid crystal located between the substrates, a tilt angle defined by ½ of the cone angle of the liquid crystal and spontaneous polarization of the liquid crystal molecules of the liquid crystal; and a determination step of determining a degree of display burning based on a normalized permittivity $\epsilon_s$ defined by a following equation 3:

$$\epsilon_s = \epsilon(\theta^2/P_s^2) \quad (3)$$

where $\epsilon[F/m]$ is the permittivity of the liquid crystal located between the substrates, $\theta[o]$ is the tilt angle defined by ½ of the cone angle of the liquid crystal, and $P_s[nC/cm^2]$ is the spontaneous polarization of the liquid crystal molecules of the liquid crystal.

A liquid crystal display device which is to be evaluated by the present invention comprises a liquid crystal having spontaneous polarization, such as a ferroelectric liquid crystal or an antiferroelectric liquid crystal, is likely to suffer display burning and has a gradation display capability. As apparent from the equation 3, the possible display burning of such a liquid crystal display device can be evaluated objectively by using the value of the normalized permittivity $\epsilon_s[=\epsilon(\theta^2/P_s^2)]$ as an index, so that the degree of display burning of the liquid crystal display device can be predicted without actually measuring the display burning of the liquid crystal display device. This contributes to reducing the time and cost of producing the liquid crystal display device.

The display burning of a liquid crystal display device is allowable within the range where the normalized permittivity $\epsilon_s$ is equal to or smaller than 8 or more preferably is equal to or smaller than 5 as indicated by the equation 1. Comparing the normalized permittivity $\epsilon_s$ with those values can therefore make it possible to determine whether the display quality is acceptable or not. The equation 1 is applicable to both a ferroelectric liquid crystal and an antiferroelectric liquid crystal.

To achieve the second object, according to the fourth aspect of the invention, there is provided a method of evaluating display burning of a liquid crystal display device comprising a pair of substrates arranged opposite to each other, electrodes arranged on opposing surfaces of the pair of substrates and facing each other, and a liquid crystal provided between the substrates and having spontaneous polarization and a physical property such that when a voltage of one polarity and a sufficiently large level is applied between the electrodes, liquid crystal molecules are aligned in a first direction, when a voltage of a polarity opposite to the one polarity and a sufficiently large level is applied between the electrodes, the liquid crystal molecules are aligned in a second direction, and when a voltage lying between the voltage of the one polarity for aligning the liquid crystal molecules in the first direction and the voltage of the other polarity for aligning the liquid crystal molecules in the second direction is applied between the electrodes, a director is aligned in an arbitrary direction corresponding to the applied voltage and in a cone angle formed by the first direction and the second direction. The method comprises a property evaluation step of acquiring a physical property including a tilt angle defined by ½ of the cone angle of the liquid crystal and spontaneous polarization of the liquid crystal molecules of the liquid crystal; a computation step of acquiring a capacitance of the liquid crystal display device per unit area; and a determination step of determining whether or not the acquired tilt angle, spontaneous polarization and capacitance satisfy the following equation 2:

$$C(\theta^2/P_s^2) \leq 8 \quad (2)$$

where $C[F/cm^2]$ is the capacitance of the liquid crystal display device per unit area, $\theta[o]$ is the tilt angle defined by ½ of the cone angle of the liquid crystal, and $P_s[nC/cm^2]$ is the spontaneous polarization of the liquid crystal molecules of the liquid crystal.

This method can permit the display burning of such a liquid crystal display device to be evaluated objectively by using the value of the normalized permittivity $\epsilon_s[=\epsilon(\theta^2/P_s^2)]$ as an index. The use of the normalized capacitances, can allow the degree of display burning of the liquid crystal display device to be predicted without actually measuring the display burning of the liquid crystal display device. This contributes to reducing the time and cost of producing the liquid crystal display device.

DETAILED DESCRIPTION OF THE PREFERRED EMBODIMENTS

Liquid crystal display devices will be described below as embodiments of the present invention with reference to the accompanying drawings.

Figure 1:
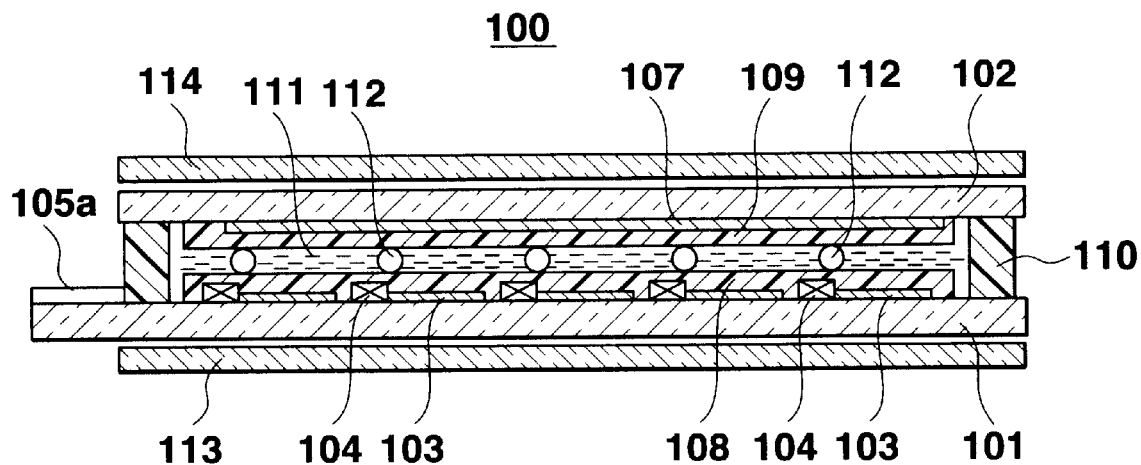
FIG. 1 is a cross-sectional diagram illustrating the structure of a liquid crystal display device according to one embodiment of the invention.

FIG. 1 shows the cross-sectional structure of an antiferroelectric liquid crystal display device (hereinafter referred to as "liquid crystal display device") 100 according to one embodiment of the invention. In the following description of the embodiment, the liquid crystal display device 100 will be described as a display device which uses thin film transistors (TFTS) as active elements and provides an active matrix type monochromatic gradation display.

The liquid crystal display device 100 has a pair of transparent substrates (e.g., glass substrates) 101 and 102. Transparent pixel electrodes 103 and TFTs 104 connected to the pixel electrodes 103 are arranged on one substrate (hereinafter referred to as "lower substrate") 101 in a matrix form.

Formed on the other substrate (hereinafter referred to as "upper substrate") 102 is a transparent opposing electrode 107 facing the pixel electrodes 103 formed on the lower substrate 101. The single opposing electrode 107 has an area over the entire display area.

Alignment films 108 and 109 are respectively formed on the electrode-forming surfaces of the lower substrate 101 and the upper substrate 102. The alignment films 108 and 109 are formed of an organic polymer compound, such as polyimide. The opposing surfaces of the alignment films 108 and 109 has undergone an alignment process, such as rubbing, so that the alignment films 108 and 109 have alignment restricting force which causes crystal molecules in the vicinity of the surfaces to be aligned in the direction of the alignment process (a third direction 111c in FIG. 2 to be discussed later).

The lower substrate 101 and upper substrate 102 are adhered together at the peripheral edge portions by a frame-shaped seal member 110. An antiferroelectric liquid crystal 111 is sealed in the area that is surrounded by the seal member 110 between the substrates 101 and 102. The layer of the antiferroelectric liquid crystal 111 is kept at a predetermined thickness by the seal member 110 and a transparent gap member 112.

In the embodiment, the layer thickness of and the material for the antiferroelectric liquid crystal 111 are selected in such a way that the value of a normalized permittivity $\epsilon_s$ which is acquired by normalizing the permittivity $\epsilon_s$ of the antiferroelectric liquid crystal 111 with the square of the tilt angle θ[o] (½ of the cone angle of the antiferroelectric liquid crystal 111 between the transparent substrates 101 and 102 by the interaction of the applied electric field and spontaneous polarization) and the square of the spontaneous polarization $P_s[nC/cm^2]$ becomes equal to or lower than 8[(ocm)²/(CVm)×10⁹], more preferably, equal to or lower than 5, i.e., the normalized permittivity $\epsilon_s$ meets the following equation 1. The layer, thickness is so set as to approximately coincide the thickness that provides the optimal retardation (optical path difference).

$$\epsilon_s = \epsilon(\theta^2/P_s^2) \leq 8 \tag{1}$$

A pair of sheet polarizers 113 and 114 are so arranged as to sandwich the transparent substrates 101 and 102. The sheet polarizer 113 is arranged so that its optical axis extends in the direction of approximately 22.5o with respect to the direction of the alignment process. The sheet polarizer 114 is arranged so that its optical axis is perpendicular or parallel to the optical axis of the sheet polarizer 113.

Figure 2:
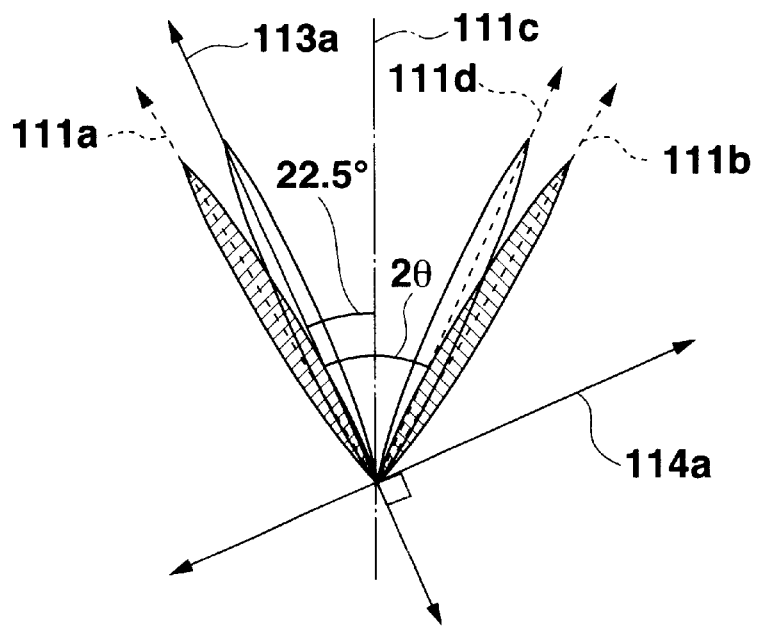
FIG. 2 is a diagram showing the relationship between the transmittance axis of a sheet polarizer of the liquid crystal display device shown in FIG. 1 and the alignment direction of the liquid crystal molecules of an antiferroelectric liquid crystal.

Referring now to FIG. 2, a description will be given of the positional relationship between the alignment direction, of the molecules of the antiferroelectric liquid crystal 111 and the optical axes of the sheet polarizers 113 and 114 in the embodiment.

The director (the average direction of the long axis of the liquid crystal molecules) of the antiferroelectric liquid crystal 111 is set to a first direction 111a when a positive, first saturation voltage large enough to cause a phase change of the liquid crystal molecules is applied between the pixel electrodes 103 and the opposing electrode 107 and is set to a second direction 111b (which is shifted from the first direction 111a by twice the tilt angle θ) when a second saturation voltage which has the opposite polarity to that of the first saturation voltage and whose absolute value is large enough to cause a phase change of the liquid crystal molecules is applied to the antiferroelectric liquid crystal 111. When no voltage is applied, the director of the antiferroelectric liquid crystal is set to the aforementioned third direction 111c which nearly matches with the direction of the alignment process.

When an arbitrary voltage lying between the first saturation voltage and the second saturation voltage is applied to the antiferroelectric liquid crystal 111, the director of the antiferroelectric liquid crystal is set to an intermediate direction between the first direction 111a and the second direction 111b in accordance with the applied voltage. The application of a voltage lying between the first saturation voltage and the second saturation voltage can set the director of the antiferroelectric liquid crystal 111 to any direction in the range of the cone angle 2θ shown in FIG. 2. Therefore, controlling the voltage that is applied and maintained between the pixel electrodes 103 and the opposing electrode 107 can allow the liquid crystal display device 100 to demonstrate a gradation display capability.

In the embodiment, the optical axis of the sheet polarizer 113, e.g., a transmittance axis 113a, perpendicularly intersects the direction 111c of the alignment process (approximately normal to the chiral smectic layer) at an angle of 22.5o as shown in FIG. 2. The optical axis of the sheet polarizer 114, e.g., a transmittance axis 114a, perpendicularly intersects the transmittance axis 113a of the sheet polarizer 113.

As the transmittance axes 113a and 114a of the sheet polarizers 113 and 114 are set as shown in FIG. 2 in this structure, the liquid-crystal display device 100 has the lowest transmittance when the director of the antiferroelectric liquid crystal 111 is set to the direction 113*a* (the direction of θ=22.5o). The liquid crystal display device 100 has the highest transmittance when the director of the antiferroelectric liquid crystal 111 is set to a direction 113*d* (the direction of 45o with respect to the direction 113*a*). When the director of the antiferroelectric liquid crystal 111 is set to a direction other than those directions, light passes in accordance with the alignment state so that the liquid crystal display device 100 provides a brightness according to the average alignment state of the liquid crystal molecules. As an arbitrary voltage lying between the first saturation voltage and the second saturation voltage is applied to the antiferroelectric liquid crystal 111, therefore, the liquid crystal display device 100 can display a gradation level according to the applied voltage.

As described above, the antiferroelectric liquid crystal 111 is constructed in such a way that the normalized permittivity $\epsilon_s$ acquired by normalizing the permittivity $\epsilon$ of the antiferroelectric liquid crystal 111 with the square of the tilt angle θ and the square of the spontaneous polarization $P_s$[nC/cm$^2$] becomes equal to or lower than 8[(ocm)$^2$/(Cvm)×10] as shown in the equation 1, more preferably, equal to or lower than 5. With this particular structure, even when an arbitrary voltage is applied between the pixel electrodes 103 and the opposing electrode 107 for a long period of time, the director of the antiferroelectric liquid crystal 111 can easily return to the direction 111*c* that nearly matches with the original alignment direction with no electric field applied, once the application of the voltage is stopped.

Therefore, the liquid crystal display device 100 does not easily have display burning and can keep displaying high-quality images. Unlike the ordinary antiferroelectric liquid crystal display device whose gradation display becomes unclear if the influence of the voltage that has been applied to the liquid crystal remains, the liquid crystal display device 100 has the improved gradation display capability which is free of the conventional problem and can display high-quality images.

A description will now be given of the conditions for the equation 1 that can allow the liquid crystal display device 100 of the embodiment to suppress display burning.

A plurality of liquid crystal display cells (hereinafter referred to as "LCD cells") each having a structure common to the liquid crystal display device 100 shown in FIG. 1, except for the material for and the layer, thickness of the antiferroelectric liquid crystal used in the liquid crystal display device 100 are prepared and their characteristics are set in the following manner.

Figure 3A:
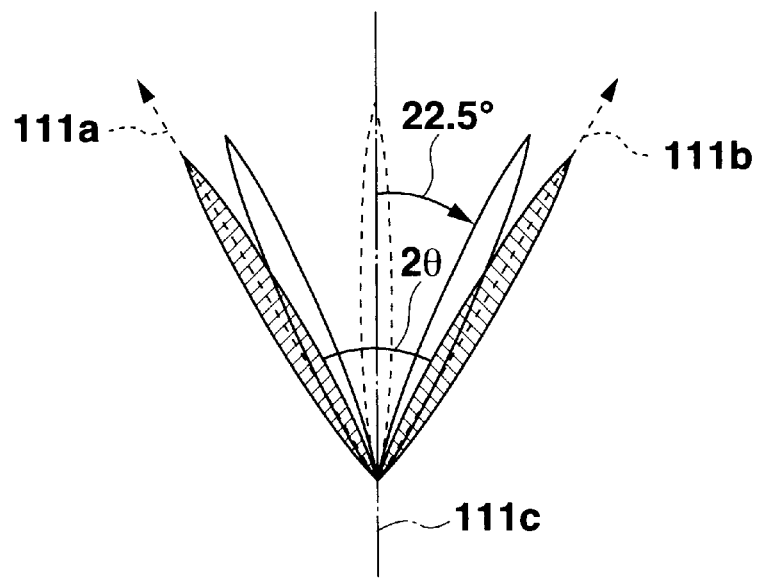
FIGS. 3A and 3B are diagrams for explaining a change Δ in the inclination angle or tilt angle of the liquid crystal molecules which may be a factor for display burning.

First, with no electric field applied, the director of the antiferroelectric liquid crystal 111 is at the center of the cone angle 2θ as shown in FIG. 3A. Next, a DC (Direct Current) voltage is applied between the pixel electrodes 103 and the opposing electrode 107 of each LCD cell in such a way that the tilt angle θ of the director of the antiferroelectric liquid crystal 111 becomes equal to 22.5o and each LCD cell is left in this condition for one hour. The application of this voltage sets the director of the antiferroelectric liquid crystal 111 in the direction 111*a*. Then, the pixel electrodes 103 are short-circuited with the opposing electrode 107, and each LCD cell is further left in this condition for one hour. As a result, the LCD cells become a field-less state so that the liquid crystal molecules aligned in the direction 111*a* tend to return to the direction 111*c* of the alignment process.

Figure 3B:
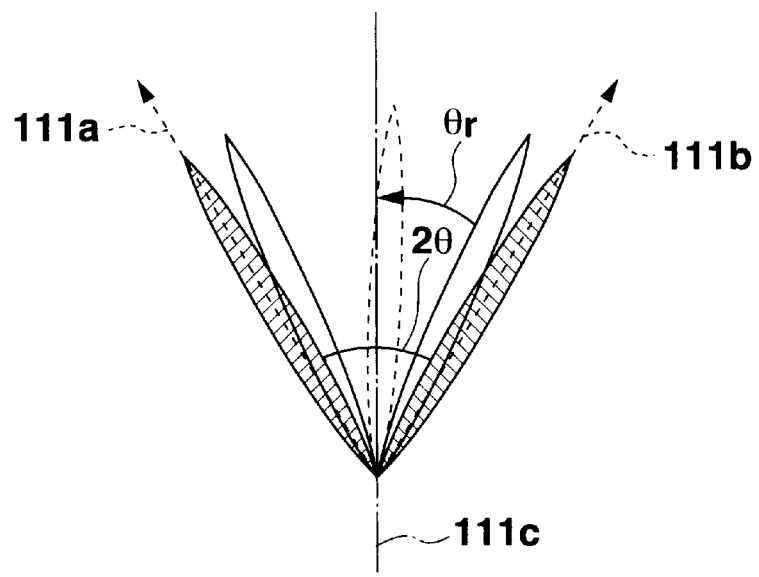

As the same voltage is continuously applied to the LCD cells for one hour, however, charges of the opposite polarity to that of the spontaneous polarization which are originated from the ionic impurity contained in the liquid crystal are stored in the vicinity of the lower substrate 101 and upper substrate 102. Even if the LCD cells comes the field-less state, from the macroscopic point of view, the interaction of the charges whose polarity is opposite to that of the spontaneous polarization prevents the liquid crystal molecules from freely moving so that the liquid crystal molecules do not completely return to the original state as shown in FIG. 3B. That is, the antiferroelectric liquid crystal 111 has a director in the direction lying between the direction 111*c* of the alignment process and θ=22.5o.

For each LCD cell, the return angle, θr, (with θ=22.5o as a reference position) of the liquid crystal molecules of the antiferroelectric liquid crystal 111 having the aforementioned director is measured by a polarization microscope as shown in FIG. 3B, and a change Δ in the tilt angle of the director of the antiferroelectric liquid crystal 111 between the time when the voltage is applied and the time when the voltage application is stopped is acquired from an equation 4 below.

$$\Delta = |100 \times (1 - \theta r/22.5)| \quad (4)$$

In the equation 4, when θr=22.5o, i.e., when the director of the antiferroelectric liquid crystal 111 returns to the original alignment direction under no electric field applied (nearly in the direction 111*c* of the alignment process), the change Δ becomes 0. When θr=0o, i.e., when the director does not return at all from the state in the field-less condition, the change Δ becomes 100. The larger the change Δ is, therefore, the greater the degree of display burning is, and the smaller the change Δ is, therefore, the smaller the degree of display burning is.

To normalize the acquired change Δ with the permittivity $\epsilon$ of the liquid crystal, the permittivity of the sealed liquid crystal should be obtained. Because it is difficult to directly acquire the permittivity $\epsilon$ of the antiferroelectric liquid crystal 111 sealed in the liquid crystal display device 100, the capacitance, $C_c$, of each LCD cell per unit area is obtained first.

First, an AC (Alternate Current) voltage V of a low frequency equal to or lower than 10 kHz is applied between the pixel electrodes 103 and the opposing electrode 107 in the LCD cell, the charges Q stored in the LCD cell are measured, and the capacitance $C_c$ per unit area is acquired from a following equation 5 where S is the effective area of the pixel electrodes 103.

$$C_c = Q/V \cdot 1/S \quad (5)$$

The previously measured thickness of the alignment film and the influence thereof are eliminated from the capacitance $C_c$, thus yielding a capacitance $C_{LC}$ of the liquid crystal layer alone. Next, the permittivity $\epsilon$ of the liquid crystal is acquired from the known thickness of they liquid crystal layer.

Further, the spontaneous polarization $P_s$[nC/cm$^2$] is measured from the polarization inversion current that flows when the direction of the spontaneous polarization of the liquid crystal is inverted.

The tilt angle θ that is expressed by ½ of the cone angle 2θ of the liquid crystal is measured by the polarization microscope.

For each LCD cell, the normalized permittivity $\epsilon_s$ which is the permittivity $\epsilon$ of the liquid crystal of each LCD cell normalized with the tilt angle θ and the spontaneous polarization $P_s$ is computed from an equation 6 below using the measured values.

$$\epsilon_s = \epsilon \times (\theta^2/P_s^2) \quad (6)$$

For multiple LCD cells with different conditions, such as the material for the liquid crystal and the thickness of the alignment film, the change Δ and the normalized permittivity $\epsilon_s$ are acquired. The change Δ and the normalized permittivity $\epsilon_s$ have a positive exponential correlation with each other as shown in FIG. 4.

Figure 4:
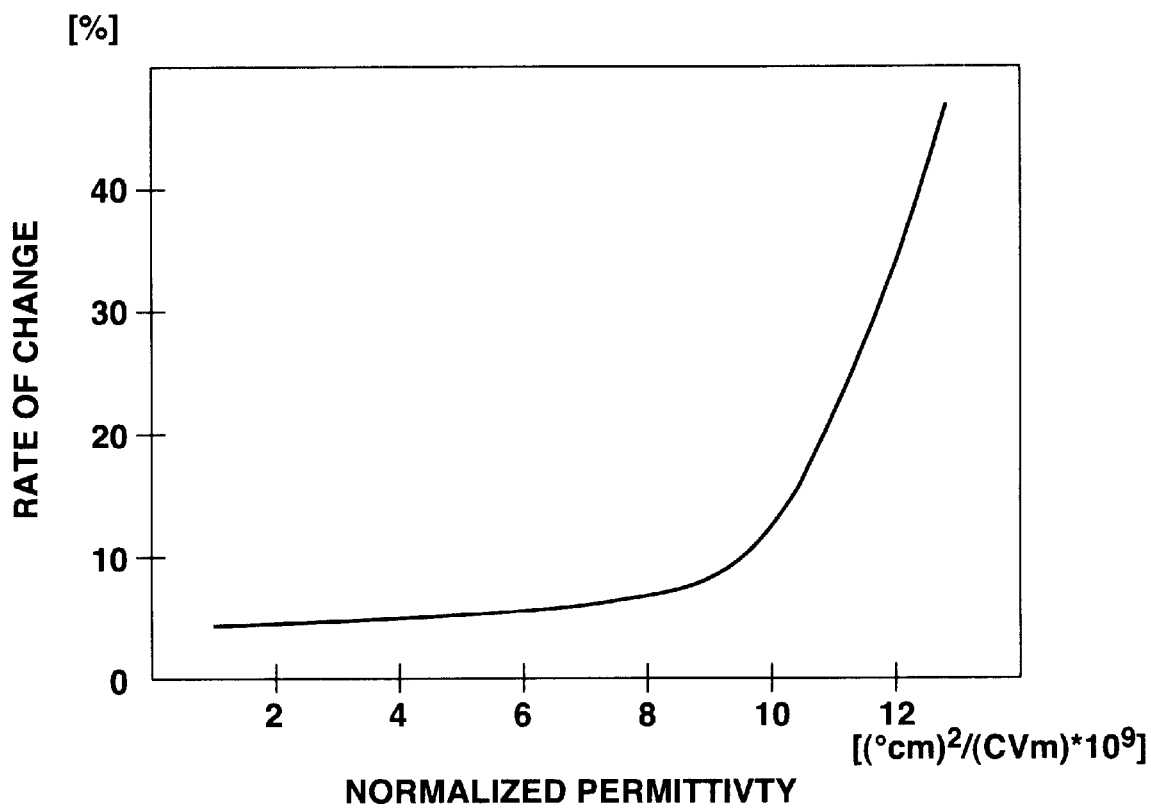
FIG. 4 is a diagram showing the relationship between a change Δ in the tilt angle of the liquid crystal molecules, and the normalized permittivity $\epsilon_s$ of the liquid crystal display device according to this embodiment.

The following is apparent from the correlation shown in FIG. 4. In the range over which the normalized permittivity $\epsilon_s$ changes from the infinity to $8[(ocm)^2/(CVm)\times10^9]$, as the normalized permittivity $\epsilon_s$ falls, the change Δ or the degree of display burning decreases sharply. With the normalized permittivity $\epsilon_s$ being equal to or smaller than $8[(ocm)^2/(CVm)\times10^9]$, the change Δ or the degree of display burning is stable and hardly changes.

That is, with the normalized permittivity $\epsilon_s$ being equal to or smaller than $8[(ocm)^2/(CVm)\times10^9]$, the change Δ or the degree of display burning is equal to or less than 10% which is low enough to be practically allowable. More preferably, the normalized permittivity $\epsilon_s$ should be equal to or smaller than 5 to make the degree of display burning equal to or less than 5%. It is empirically confirmed that the allowable range of display burning is where the normalized permittivity $\epsilon_s$ satisfies the equation 1, so that the change Δ becomes equal to or less than 10%.

From the above-described results of the experiment, it is understood that the practically allowable range for the normalized permittivity $\epsilon_s$ of the antiferroelectric liquid crystal 111 used in the liquid crystal display device is equal to or smaller than $8[(ocm)^2/(CVm)\times10^9]$.

To achieve gradation display with suppressed display burning, therefore, the antiferroelectric liquid crystal 111 whose normalized permittivity $\epsilon_s$ is adjusted to be equal to or smaller than $8[(ocm)^2/(CVm)\times10^9]$ should be used as in the liquid crystal display device 100 that has been described in the foregoing description of the embodiment. It is to be noted however that for the liquid crystal display device 100 to provide the adequate display, the proper retardation should be secured. As in the ordinary liquid crystal display devices, therefore, the material for the liquid crystal and the layer thickness thereof should be adjusted to make the normalized permittivity $\epsilon_s$ equal to or smaller than $8[(ocm)^2/(CVm)\times10^9]$ while maintaining the proper retardation.

It is also apparent from the above-described experiment, the degree of display burning can be predicted and evaluated by referring to FIG. 4, without actually making a sample of the liquid crystal display device 100, by acquiring the normalized permittivity $\epsilon_s$ of the liquid crystal to be used and using the normalized permittivity $\epsilon_s$ as an index for the display burning. Specifically, it is predictable that if the normalized permittivity $\epsilon_s$ becomes greater than $8[(o\,cm)^2/(CVm)\times10^9]$, the liquid crystal display device 100 will have display burning prominently, while with the normalized permittivity $\epsilon_s$ being equal to or smaller than $8[(o\,cm)^2/(CVm)\times10^9]$, more preferably, equal to or smaller than 5, the liquid crystal display device 100 will not suffer display burning much.

Although the permittivity of the antiferroelectric liquid crystal 111 is normalized in this embodiment, the capacitance of the LCD cell per unit area (the capacitance per unit area between the pixel electrodes 103 and the opposing electrode 107 facing each other) may be normalized with the square of the tilt angle θ and the square of the spontaneous polarization $P_s$. In this case, to set the change Δ equal to or less than 10%, the value of the normalized capacitance should be equal to or smaller than $0.8[(o\,cm)^2/(CV)\times10^9]$.

As in the case where the normalized permittivity $\epsilon_s$ is used as an index for display burning, the degree of display burning can be predicted and evaluated by acquiring the value of the capacitance per unit area, normalized with the square of the tilt angle θ and the square of the spontaneous polarization $P_s$ and using the obtained capacitance.

In the foregoing description of the embodiment, the liquid crystal display device 100 has been described as using the antiferroelectric liquid crystal 111. However, the conditions for the normalized permittivity $\epsilon_s$ or the normalized capacitance under which the value of the change Δ in the tilt angle of the director of the antiferroelectric liquid crystal between the time when the voltage is applied and the time when the voltage application is stopped becomes equal to or less than 10%, more preferably, equal to or less than 5%, is applicable to general liquid crystal display devices that use a liquid crystal and liquid crystal composition which have spontaneous polarization, such as ferroelectric liquid crystal, as well as those using an antiferroelectric liquid crystal.

Although the liquid crystal display device 100 of the embodiment provides monochromatic gradation display, the invention can be adapted to a liquid crystal display device having, for example, color filters or the like to ensure color display.

Further, although the liquid crystal display device 100 of this embodiment has been described as a transmittive type, the invention can be adapted to a reflection type liquid crystal display device. In this case, the substrates or electrodes may be formed of opaque materials, such as metal, and a sheet polarizer may be provided only on one side of the liquid crystal display device (on the viewer's side).

What is claimed is:

1. A liquid crystal display device comprising:
   a pair of substrates arranged opposite to each other;
   electrodes arranged on opposing surfaces of said pair of substrates and facing each other; and
   a liquid crystal provided between said substrates and having spontaneous polarization and a physical property such that when a voltage of one polarity and a sufficiently large level is applied between said electrodes, liquid crystal molecules are aligned in a first direction, when a voltage of a polarity opposite to said one polarity and a sufficiently large level is applied between said substrates, said liquid crystal molecules are aligned in a second direction, and when a voltage lying between said voltage of said one polarity for aligning said liquid crystal molecules in said first direction and said voltage of said other polarity for aligning said liquid crystal molecules in said second direction is applied between said electrodes, a director is aligned in an arbitrary direction corresponding to said applied voltage and in a cone angle formed by said first direction and said second direction, said physical property satisfying a following equation:

$$\epsilon(\theta^2/P_s^2) \leq 8$$

where $\epsilon[F/m]$ is a permittivity of said liquid crystal located between said substrates, θ[o] is a tilt angle defined by ½ of said cone angle of said liquid crystal, and $P_s[nC/cm^2]$ is spontaneous polarization of said liquid crystal molecules of said liquid crystal.

2. The liquid crystal display device according to claim 1, wherein said liquid crystal has such a physical property as to satisfy $\epsilon(\theta^2/P_s^2) \leq 5$.

3. The liquid crystal display device according to claim 1, wherein said liquid crystal is one of a ferroelectric liquid crystal and an antiferroelectric liquid crystal.

4. A liquid crystal display device comprising:

a pair of substrates arranged opposite to each other;

electrodes arranged on opposing surfaces of said pair of substrates and facing each other; and a liquid crystal provided between said substrates and having spontaneous polarization and a physical property such that when a voltage of one polarity and a sufficiently large level is applied between said electrodes, liquid crystal molecules are aligned in a first direction, when a voltage of a polarity opposite to said one polarity and a sufficiently large level is applied between said substrates, said liquid crystal molecules are aligned in a second direction, and when a voltage lying between said voltage of said one polarity for aligning said liquid crystal molecules in said first direction and said voltage of said other polarity for aligning said liquid crystal molecules in said second direction is applied between said electrodes, a director is aligned in an arbitrary direction corresponding to said applied voltage and in a cone angle formed by said first direction and said second direction, said physical property satisfying a following equation:

$$C(\theta^2/P_s^2) \leq 0.8$$

where $C[F/cm^2]$ is a capacitance of said liquid crystal display device per unit area, $\theta[o]$ is a tilt angle defined by ½ of said cone angle of said liquid crystal, and $P_s[nC/cm^2]$ is spontaneous polarization of said liquid crystal molecules of said liquid crystal.

5. A method of evaluating display burning of a liquid crystal display device comprising a pair of substrates arranged opposite to each other, electrodes arranged on opposing surfaces of said pair of substrates and facing each other, and a liquid crystal provided between said substrate and having spontaneous polarization and a physical property such that when a voltage of one polarity and a sufficiently large level is applied between said electrodes, liquid crystal molecules are aligned in a first direction, when a voltage of a polarity opposite to said one polarity and a sufficiently large level is applied between said electrodes, said liquid crystal molecules are aligned in a second direction, and when a voltage lying between said voltage of said one polarity for aligning said liquid crystal molecules in said first direction and said voltage of said other polarity for aligning said liquid crystal molecules in said second direction is applied between said electrodes, a director is aligned in an arbitrary direction corresponding to said applied voltage and in a cone angle formed by said first direction and said second direction, said method comprising:

a property evaluation step of acquiring a physical property including a permittivity of said liquid crystal located between said substrates, a tilt angle defined by ½ of said cone angle of said liquid crystal and spontaneous polarization of said liquid crystal molecules of said liquid crystal; and a determination step of determining a degree of display burning based on a normalized permittivity $\epsilon_s$ defined by a following equation:

$$\epsilon_s = \epsilon(\theta^2/P_s^2)$$

where $\epsilon[F/m]$ is said permittivity of said liquid crystal located between said substrates, $\theta[o]$ is said tilt angle defined by ½ of said cone angle of said liquid crystal, and $P_s[nC/cm^2]$ is said spontaneous polarization of said liquid crystal molecules of said liquid crystal.

6. The method according to claim 5, wherein said determination step determines whether or not said permittivity $\epsilon$, said tilt angle $\theta$ and said spontaneous polarization $P_s$ obtained in said property evaluation step satisfy a following equation:

$$\epsilon(\theta^2/P_s^2) \leq 8.$$

7. The method according to claim 5, wherein said determination step determines whether or not said permittivity $\epsilon$, said tilt angle $\theta$ and said spontaneous polarization $P_s$ obtained in said property evaluation step satisfy a following equation:

$$\epsilon(\theta^2/P_s^2) \leq 5.$$

8. The method according to claim 5, wherein said liquid crystal is one of a ferroelectric liquid crystal and an anti-ferroelectric liquid crystal.

9. A method of evaluating display burning of a liquid crystal display device comprising a pair of substrates arranged opposite to each other, electrodes arranged on opposing surfaces of said pair of substrates and facing each other, and a liquid crystal provided between said substrates and having spontaneous polarization and a physical property such that when a voltage of one polarity and a sufficiently large level is applied between said electrodes, liquid crystal molecules are aligned in a first direction, when a voltage of a polarity opposite to said one polarity and a sufficiently large level is applied between said electrodes, said liquid crystal molecules are aligned in a second direction, and when a voltage lying between said voltage of said one polarity for aligning said liquid crystal molecules in said first direction and said voltage of said other polarity for aligning said liquid crystal molecules in said second direction is applied between said electrodes, a director is aligned in an arbitrary direction corresponding to said applied voltage and in a cone angle formed by said first direction and said second direction, said method comprising:

a property evaluation step of acquiring a physical property including a tilt angle defined by ½ of said cone angle of said liquid crystal and spontaneous polarization of said liquid crystal molecules of said liquid crystal;

a computation step of acquiring a capacitance of said liquid crystal display device per unit area; and a determination step of determining whether or not said acquired tilt angle, spontaneous polarization and capacitance satisfy a following equation:

$$C(\theta^2/P_s^2) \leq 0.8$$

where $C[F/cm^2]$ is said capacitance of said liquid crystal display device per unit area, $\theta[o]$ is said tilt angle defined by ½ of said cone angle of said liquid crystal, and $P_s[nC/cm^2]$ is said spontaneous polarization of said liquid crystal molecules of said liquid crystal.

* * * * *